March 3, 1936.    A. E. NORTHUP    2,032,630
VEHICLE BODY
Filed May 14, 1931
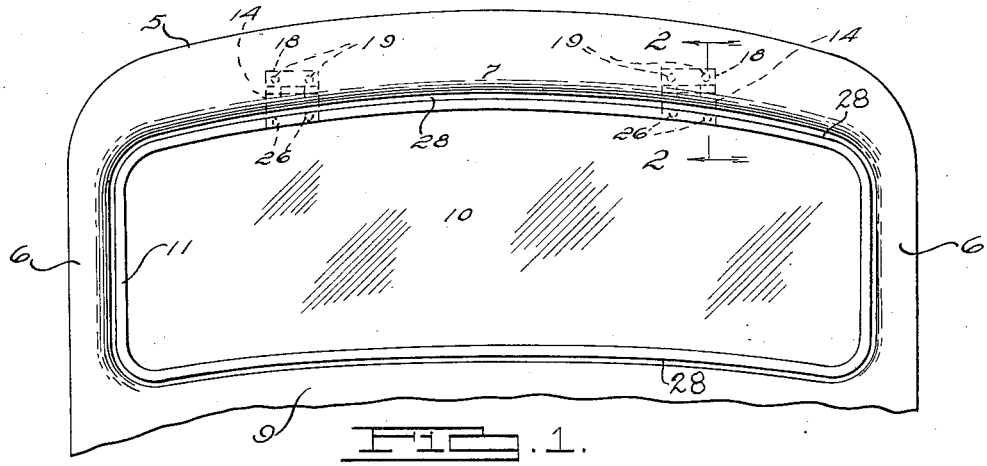
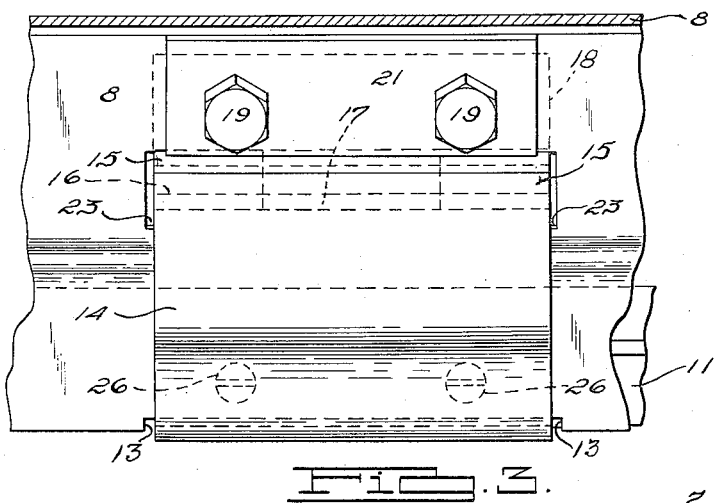
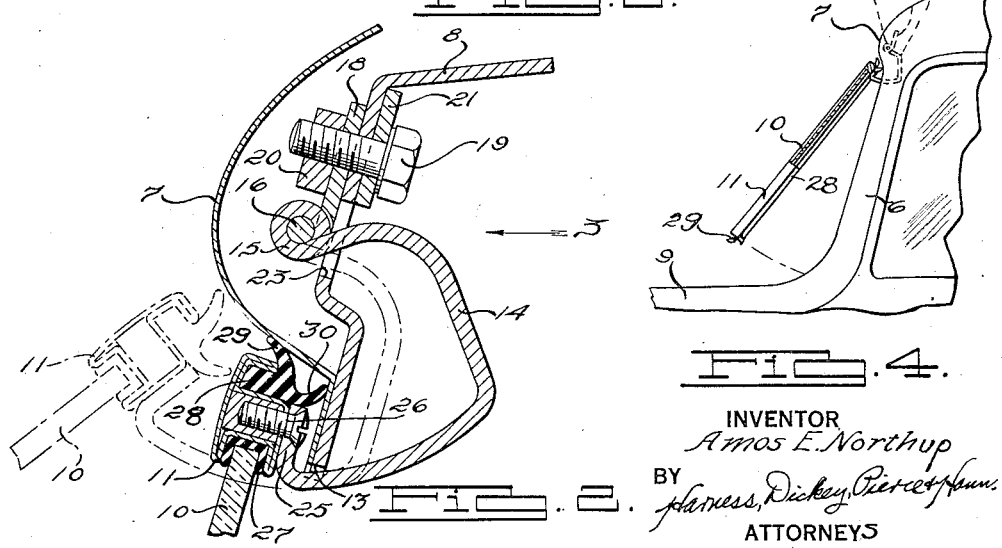
INVENTOR
Amos E. Northup
BY
Harness, Dickey, Pierce & Hann.
ATTORNEYS Patented Mar. 3, 1936

2,032,630

UNITED STATES PATENT OFFICE 2,032,630

VEHICLE BODY

Amos E. Northup, Pleasant Ridge, Mich., assignor to The Murray Corporation of America, a corporation of Delaware Application May 14, 1931, Serial No. 537,350

15 Claims. (Cl. 296—92)

My invention relates to vehicle bodies and particularly to an improved windshield hinge construction and support for use in automobile bodies and more particularly in bodies of the closed type.

In the past it has been the practice in closed vehicle body construction to employ a roof having a substantially flat transverse contour. The front end of such roofs were usually extended forwardly a considerable distance over the top of the windshield. In addition to this projection, an overhanging vizor was generally attached to the front end of the roof. It was also the general practice to mount such windshields so that they could be opened for ventilation. The two most common types employed were the vertical sliding and the pivotally hung windshields. In the use of the pivotally hung windshield the top of the windshield frame and windshield header were necessarily flat and straight or rectilinear to permit axial alignment of the hinges.

The latest trend of automobile design is toward the lowering of the bodies upon the chassis, enhancing the esthetic appearance and the symmetry and beauty of the lines and stream lining the contour of the bodies to improve the appearance and, of equal importance, to lessen wind resistance and effects. This trend of design has led to the development and increasing popularity of the rounded vizorless header construction, which presents a sweeping rounded line flowing from the windshield to the roof. The front edge of the roof in such construction terminates a considerable distance back of the top of the windshield frame and a header panel is employed which in effect arcuately slopes down toward the top of the windshield. This rounded panel takes the place of what was known as the front roof panel, or may be said to combine the front roof panel with the new round header panel which encloses the windshield header member. Such construction and design when used with a sloping windshield presents a frontal appearance having a pleasing line from roof to cowl and is very desirable. The rounded header panel above the windshield is usually painted or finished in the same manner or in harmony with the rest of the body increasing the effect.

The windshield used with the new round header construction has heretofore been mounted in a fixed and closed position. Ventilation was obtained through conventional ventilating means provided in the top and in the sides of the cowl paneling. The very desirable opening of the windshield was eliminated because the commonly known types of pivotal suspending means were unsightly and would destroy the beauty and symmetry of the rounded head, and because of a mechanical obstacle prevented in that the arch or transverse contour of the roof, windshield header and upper windshield frame prevented axial alignment of the common types of hinges formerly employed since the relatively high center of the arch prevented swinging of the windshield frame.

My invention is directed to the correction of these undesirable qualities in such body construction and windshield mountings.

It is an object of my invention to provide improved means of pivotally mounting a windshield particularly for use with bodies having rounded header construction.

Another object of my invention is to provide concealed means for pivotally mounting a windshield.

A further object of my invention is to so construct and mount a windshield having a rounded transverse contour and a transversely arched frame, that the same may be swung to closed or open position.

A still further object of my invention is to provide an improved windshield hinge.

Yet another object of my invention is to provide an improved weather proofing construction for a pivotally hung windshield.

Further objects and advantages will become more apparent throughout a reading of the following detailed description and accompanying drawing, in which:

Fig. 1 is a front view of the upper portion of a vehicle body illustrating the rounded header panel and windshield construction to which my invention is particularly adaptable.

Fig. 2 is an enlarged cross-sectional view of the improved hinge of my invention taken on the line 2—2 of Fig. 1 looking in the direction indicated by the arrows.

Fig. 3 is an enlarged rear elevational view of the hinge illustrated in Fig. 2, and Fig. 4 is a fragmentary side view of a portion of the front end of a vehicle body illustrating the application of my invention to the round header construction.

Referring now to the drawing in detail in which like numerals designate like parts throughout the several views, I have shown in Fig. 1 the front end of the upper portion of a vehicle body including the windshield and surrounding body structure. The structure shown is of the rounded type described herein having a roof 5 of rounded transverse contour which is supported at each side of the front edge by suitable front body pillars which in the construction illustrated in the drawing are covered by pillar paneling 6. A rounded header panel 7 of general arcuate shape is employed in place of the well known front roof panel and extends downwardly from the roof to form the upper boundary of the windshield opening. The windshield opening is framed at the top by the rounded header panel 7, at the sides by the side pillar panels 6 which are brought down from the roof and the arcuate header panel 7 and at the bottom by the rear top edge of the cowl paneling 9, the respective members being suitably rabbetted to receive the windshield. A windshield which comprises a sheet of glass 10 mounted in a metal frame 11 which embraces its edges is mounted in the windshield opening as will hereinafter be described in detail. It will be noted that the outline of the windshield opening is markedly rounded at the upper and lower sides and that the header panel 7 is brought down to the upper side of the windshield opening in a pleasing unbroken curve.

In the improved mounting construction of my invention I employ a metal hinge arm 14 which is generally hook shaped in side elevation as clearly illustrated in Fig. 2 of the drawing and is offset in relation to the point of suspension for reasons which will hereinafter become apparent. In the particular form of hinge illustrated in the drawing the arm 14 is fairly wide, although the width or dimension of this arm is not a material part of my invention. Sleeve portions 15 are formed at the upper end of the arm 14 and are rotatably mounted on a transversely extending pin 16. These portions are centrally bifurcated to receive a sleeve portion 17 of an attaching plate 18, the pin 16 passing through the sleeve 17 in the same manner as through the sleeves 15, whereby the arm 14 is secured in hinged relation to the plate 18. The attaching plate 18 is secured to the steel windshield header 8 by a pair of bolts 19 and nuts 20, a suitable spacing plate 21 being interposed between the header 8 and bolt heads. The hinged arm 14 passes through and is movable in an opening 23 cut in the header 8. The hinge is so positioned when attached to the header 8 that the lower portion of the arm 14 is at right angles to the rear downwardly extending portion, and will swing free and clear of the bottom edge of the header 8, a slot 13 being provided therein to allow the necessary clearance and position the forward part of the lower portion of the arm 14 in desired relation to the top side of the windshield frame 11. The rounded header panel 7 is brought down in an arc over the windshield header 8 and encloses and conceals the header, and entire hinge and pivot members. The lower edge of the header panel 7 engages and is secured to the windshield header 8 along its lower edge in any suitable manner such, for example, as spot welding.

The lower and forward end of the hinged arm 14 which projects forwardly of the top side of the windshield opening and is close thereto is bent upwardly to form a flat shoulder 25. The windshield is securely attached to this shoulder by means of screws 26 or other suitable fastening devices which pass through suitable openings in the shoulder 25 of the arm 14 and are threaded in openings in the windshield frame 11. A pair of such hinges, properly spaced, are shown in the drawing although any suitable number may be employed. The frame 11 surrounds the windshield glass 10 and is formed with a channel adapted to receive a channel weather strip 27, of rubber or other suitable material, in which the edge of the glass is received as clearly shown in Fig. 2. The outer edge of the frame 11 is also provided with a channel in which is secured a weather strip 28, of rubber or other suitable material, which extends entirely around the frame. This weatherstripping is continuous and unbroken, sealing the entire windshield opening between the outer periphery of the windshield frame and the rounded header panel at the top, the side pillars at the sides and the cowl panel at the bottom. As illustrated in the drawing, the weather strip 28 is provided with a flexible tongue 29 extending outwardly and adapted to bear against the panel surfaces adjacent the windshield opening to exclude water and wind. Another flexible tongue 30 extends inwardly at right angles to the windshield to engage the flat abutting rabbetted surfaces of the panel members. It is to be noted that the weatherstrip is unbroken at the hinge points and seals the entire periphery of the shield, extending, as it does, entirely across the top side of the windshield.

A windshield so mounted may be swung outwardly for ventilation on the hinges 14 as indicated by the dotted lines in Fig. 2. The top of the windshield frame will be swung out and upwardly in an arc due to the shape of the hinge arms 14 and the manner in which they are hung, the offset design of the hinge permitting the location of the pivot point within the rounded header panel 7. The downwardly extending rearward portion of the hinge arm 14 is offset from the pivot point at the top the proper distance to clear the header 8. The lower forwardly projecting portion of the arm transmits the direction of motion or line of force forwardly to swing out the entire top edge of the windshield, which feature permits the opening of transversely curved windshields.

The entire hinge and mounting construction is concealed within the rounded header panel so that the beauty and symmetry of the lines of the panel are preserved in the use of the construction of my invention and the windshield may be opened for ventilation.

While I have described but a single embodiment of my invention, it will be apparent to any one skilled in the art that many omissions, additions, changes and substitutions may be made therein without departing from the spirit and scope of my invention as set forth in the accompanying claims.

I claim:

1. In a closed vehicle body, the combination with a rounded header panel which curves rearwardly from the windshield opening at which it is arcuately shaped laterally thereacross, a laterally arcuate shaped windshield in said opening, and means concealed within the header panel pivotally supporting said windshield for outward swinging movements, said means being adapted to swing the entire upper transverse edge of the windshield out of the plane of the windshield opening.

2. In a vehicle body, the combination with a rounded header panel above a windshield opening which is of lateral arcuate shape, a windshield and a hinge concealed behind the header panel to pivotally support said windshield, said hinge being adapted to swing the entire upper transverse edge of the windshield out of the plane of the windshield opening.

3. In a vehicle body having a rounded header panel of lateral arcuate shape above a windshield opening which curves rearwardly therefrom, in combination with a windshield and means substantially enclosed within the header panel to pivotally support said windshield for outward swinging movements, said means being adapted to swing the entire upper transverse edge of the windshield out of the plane of the windshield opening.

4. A vehicle body having a header panel above a windshield opening which is arcuately shaped laterally of the vehicle, in combination with a windshield, and supporting hinges for said windshield pivoted at a point behind the header panel and above the windshield opening and offset to permit outward swinging of the windshield and to permit the windshield to be swung entirely out of the plane of the windshield opening.

5. A windshield mounting structure for a vehicle body including a windshield header, hinges pivotally mounted on said header having offset portions projecting forwardly of said header under the lower edge thereof, a windshield secured at its inner side edge to and supported by the forwardly projecting offset portions of said hinges, and a finishing panel substantially enclosing said hinge and header structure.

6. A windshield mounting structure for a vehicle body including a windshield header, a panel extending over and completely enclosing said header, offset hinges pivotally mounted on said header having forwardly projecting arms rotatable longitudinally of the vehicle body relative to said header and extending under the lower edge of said header, and a windshield the rear edge of which is supported at the forward end of said hinge arms and rotatable therewith.

7. A windshield mounting structure for a vehicle body including a windshield header, offset hinges pivotally mounted on said header having forwardly projecting arms rotatable longitudinally of the vehicle body relative to said header and extending under the lower edge of said header, a windshield the rear edge of which is secured to the forward end of said hinge arms and rotatable therewith, and an arcuate shaped rearwardly presenting header panel substantially enclosing said hinge and header structure.

8. A windshield mounting structure for a vehicle body including a windshield header forming the top of a windshield opening which is of arcuate shape laterally of the vehicle, a windshield of arcuate shape at its top edge, a finishing panel extending over said header to constitute a hollow closure and pivotal means disposed within said closure adapted to support said windshield for outward swinging movements relative to said windshield opening and to swing the arcuate top edge of said windshield forwardly out of the plane of the windshield opening.

9. In a windshield header construction for a vehicle body including in combination a header defining the upper side of a windshield opening, a windshield for said opening, hinges for said windshield pivotally mounted on said header each comprising a top portion extending rearwardly of the pivot point, a rear portion depending downwardly from said top portion and a lower portion extending forwardly from said rear portion beyond the vertical plane of the top of the windshield opening, the forward end of said lower arm being bent at an angle to form a flat surface for engaging the rear side of the upper edge of the windshield, said surface being in a plane parallel to the transverse plane of the window opening.

10. A windshield hinge pivotally mounted on a windshield header at a point substantially in the vertical plane of the top of the windshield opening comprising a top portion extending back from said pivot point, and a lower arm portion extending from said top portion and projecting forwardly beyond the top of said windshield opening, the forward end of said lower arm being bent at an angle to form a flat surface for engaging the rear side of the upper edge of the windshield, said surface being in a plane parallel to the transverse plane of the window opening.

11. A windshield hinge pivotally mounted on a windshield header at a point substantially in the vertical plane of the top of the windshield opening comprising a top portion extending back from said pivot point, a lower arm portion extending from said top portion and projecting forwardly beyond the top of said windshield opening, and a shoulder formed at the forward end of said arm adapted to be attached to a windshield frame.

12. In a vehicle body, the combination with a header, a panel extending over and concealing said header and further formed to define the top marginal edge of a windshield opening which is of lateral arcuate shape and disposed in continuation of said header panel.

13. In a vehicle body, the combination with a header, a panel extending over and concealing said header and further formed to define the top marginal edge of a windshield opening which is of lateral arcuate shape, a windshield, and means supported by said header for engaging and supporting the top edge of said windshield in said opening for swinging movement.

14. In a closed vehicle body, rearwardly sloping door pillars, a header extending across the upper ends of said pillars, a header panel extending over said header and defining the upper edge of said windshield opening, a windshield, and hinges concealed by said panel and secured to said header and the top edge of said windshield for supporting the windshield for outward swinging movement.

15. In a closed vehicle body, rearwardly sloping door pillars, a header extending across the upper ends of said pillars, a header panel extending over said header and defining the upper edge of said windshield opening which is of lateral arcuate shape, a windshield having a top edge of lateral arcuate shape matable with the top edge of said windshield opening, and hinges concealed by said panel and secured to said header and the top edge of the windshield for supporting the windshield for outward swinging movement.

AMOS E. NORTHUP.